United States Patent Office 3,553,313
Patented Jan. 5, 1971

3,553,313
MANUFACTURE OF GRANULATE FEED
Luis Picas Tort, Calle Balmes 65, Barcelona, Spain
No Drawing. Filed Dec. 20, 1967, Ser. No. 691,940
Claims priority, application Spain, Dec. 21, 1966,
335,415
Int. Cl. A61k *9/00, 19/00, 27/00*
U.S. Cl. 424—33
5 Claims

ABSTRACT OF THE DISCLOSURE

Production of a granulated feed which is soluble or may be emulsified in the water or milk fed to the animals, by grinding the raw material containing the ingredients entering into the preparation to be added to the water or milk, this grinding being carried out to obtain a ground material having the appropriate degree of fineness. The material is then mixed and homogenized followed by a wetting with at least one volatile organic solvent preferably selected from the group consisting of methanol, ethanol, isopropanol, acetone, benzene, dioctane, and toluene, containing an emulsifying substance or a suspension agent dissolved in the organic solvent. The emulsifying or suspension agent are preferably selected from the group consisting of polyvinyl pyrrolidone, n-lauryl sulphates, dioxtyl sodium sulphosuccinates, alginates and polyethylene glycols. The next step consists in granulating the paste obtained from the preceding step followed by drying the granulated material and screening the resulting mixture to a 10–150-mesh size

---

This invention is directed to a process for the production of granulated substances which are soluble or may be emulsified in the water or milk fed to the animals, such as cattle and poultry.

These granulated substances are used to complement or supplement, and to enrich the animal feeds, thus supplying them with the essential factors which usually are lacking in common nutrition processes. Furthermore, these granulated substances may be used as preservative or curative treatments of animals, such as cattle and poultry.

At present, various natural or synthetic materials in solid or liquid form are incorporated into the animal feeds. These substances may also be administered by means of injections, pills or pastes. Recently, in addition to the above methods, these substances have been applied as aerosols or were incorporated to the drinking water.

It is now a common practice to feed some substances by adding them to the drinking water since it is the fastest method. These substances are usually in the form of a soluble powder, a liquid or an oily solution, and are not granular.

Granulated substances have the advantage of surrounding the active substances with a protective layer for a longer lasting action. This is due to the fact that the protective layer stops the influence of light, air or other atmospheric agents humidity and moisture that could react with the above substances. Without this protection, these substances could be modified because of the reaction that could take place within the mixtures of the various manufactured products. In the granulation process according to the invention, the active substances are not destroyed because the process is carried out practically in the absence of pressure and always at a suitable temperature.

It has now been found that it is more practical and efficient to feed additional ingredients or therapeutic products for the treatment of diseases, whether as a preventive or curative measure, when these are added to the drinking water than when they are mixed with the feeds. Depending on the disease to be treated, the absorption of these substances through drinking water, may give good results, mainly in the cases of fever, since the animals then stop eating and drink larger quantities of water than they normally do. In comparison to the individual treatments by means of pills, pastes and injections, the absorption of these substances through drinking water is more practical when raising cattle since there is no cause for discomfort to the animals because they do not have to be caught for individual treatments. Furthermore, through water, the application is given to the whole lot at once.

By adding these products to drinking water, there is an actual saving of time and labor, since the incorporation of a solid substance through the cattle feeds necessarily includes a mixing process by which it is not always possible to obtain a homogeneous proportion of the active substance. Furthermore, remainders are always present at the bottom of the feed dispenser. Individual treatments of the animals no doubt increase the amount of work proportionally to the number of heads. In both cases, this factor should well be kept in mind, considering the normal increase of the number of heads in each particular herd.

The granules of this invention are composed of mineral salts, vitamins, amino acids, antibiotics, hormones and other therapeutic products, whether preventive or curative, alone or mixed together; they are soluble or may be emulsified to produce a suspension thereof in water, when mixed therewith, or a dispersion by means of emulsifying or suspension agents or both, such as polyvinyl pyrrolidone, n-lauryl sulphates, dioctyl sodium sulphosuccinates, alginates and polyethylene glycols. Organic solvents, such as methanol, ethanol, isopropanol, acetone, benzene, dioctane, and toluene are used along with the same emulsifying or suspension agents to produce suspensions or dispersions.

In order to hide the bad taste which may be present in some substances, the following compounds could be added: glucose, dextrose, sucrose, glutamic acid and its salts, saccharine and cyclo-hexamate, which at the same time, may also improve the activity of the above substances.

The process according to the invention consists in milling the different raw materials of the preparation to be made, in case they do not have the appropriate grade of fineness; mixing and homogenizing the components that will form the granulated material of the preparation; preparing the emulsifying and suspension agents and dissolving them into one or several volatile organic solvents; wetting the substances of the preparation with an appropriate proportion of agglutinators and organic solvents to form a pasty mass; granulating the mass so obtained by forcing it through a stainless steel sieve, or by treating the same in a milling apparatus or in any machine suitable for this operation; conveniently drying the granulated material while removing the spent solvents. This last step may be carried out in drying stoves with dried air or under vacuum, according to each particular case. For example, the temperature at which this operation is carried out is between —20 to 30° C., when a high vacuum and low temperature are used. When a flow of dry air is used, the temperature is preferably set at 20–80° C. and between 30° to 110° C., when a drying stove is used. Finally, the last step comprises sieving the resulting product through an electric vibrating screen of the double cover type or in a dry granulator equipped with a 10 to 50-mesh sieve, and collecting the resulting product on an appropriate device having a base formed of a 70 or 80-mesh sieve, to eliminate the thin and fine materials.

The invention will now be described with regards to the obtention of certain soluble granulated materials for the combined administration of substances, according to the respective quantities of the same as indicated in each particular case. However, it is understood that these examples are used to illustrate the invention but they are not given to limit it in any manner especially with respect to ratios, ingredients and specific conditions used therein.

PREPARATION NO. I

Combined dissolved substances and their uses in drinking water for poultry (livestock)

Vitamin A D, 250/250 w.—2.4 g.
Vitamin A, 250 w.—21.6 g.
Vitamin E, 25%—5.0 g.
Glucose—31.9 g.
Polyvinyl pyrrolidone—4.0 g.
Sorbic acid—5.0 g.
Monosodium glutamate—30.0 g.
Yellow dye—0.1 g.
Isopropyl alcohol—15 ml.

100 g. of the above preparation contain the following:

Vitamin A—6,000,000 International units.
Vitamin D—600,000 International units.
Vitamin E—1,250 International units.

Glucose, sorbic acid and monosodium glutamate are ground. A mixture is then formed of the vitamins, ground glucose, sorbic acid and monosodium glutamate, and the dye. Polyvinyl pyrrolidone is dissolved in isopropyl alcohol. The above substances are moistened and beaten through the polyvinyl pyrrolidone solution. Granulation is carried out through a 20-mesh sieve and the granulated material is dried in a drying oven for 20 hours at 40° C. The granulated material is given a final sieving treatment through a 16-mesh sieve after which it is packed in a thoroughly dry air-tight container.

Using the above granular material, a test is made on 50 two month old birds to determine their acceptance of water having the above granulated material incorporated therein. At the same time, another container is provided with natural water, in order to determine the consumption from both water supplies.

The test is carried out by using two fountains, each having a water capacity of 10 litres. These fountains are brand new, and are placed at different sites than the ones from which the birds usually drink.

After 24 hours, the water consumption is as follows:

Untreated water—3.75 l.
Water containing granulated material—4.00 l.

For two month old birds, the water consumption is 6 to 7.75 litres per 50 animals, but these figures vary according to weather conditions. Thus, according to the above results, it can be stated that the amount of water taken by the animals is the normal quantity, and that they drank approximately the same amount of natural water as the water treated with the granulated material, even though the consumption of the last one was slightly higher.

PREPARATION NO. II

Combined dissolved substances

This is a preparation for the combined use of vitamins, minerals and amino acids, which is also added to the livestock drinking water:

| | |
|---|---:|
| Vitamin A D | 0.4 |
| Vitamin A | 1.6 |
| Vitamin E | 3.0 |
| Sorbic acid | 0.5 |
| Copper sulphate | 0.8 |
| Cobalt sulphate | 0.025 |
| Soluble manganese citrate | 7.05 |
| Zinc chloride | 3.35 |
| Magnesium glycerophosphate | 37.5 |
| Iron saccharate | 3.76 |
| Sodium selenite | 0.015 |
| Polyvinyl pyrrolidone | 3.0 |
| Glutamic acid | 9.0 |
| Glucose | 30.0 |
| | 100.0 |

Glucose, sorbic acid, glutamic acid and the minerals are ground. The formula weight control is determined and a mixture is formed. Then, the agglutinating agent is dissolved in an organic solvent, in this case, isopropyl alcohol. The compounds forming the formula are wetted and beaten with the agglutinating solution. Granulation is carried out through a 20-mesh screen and the granulated material is dried in a drying oven for two hours at 40° C. and then for four hours at 80° C. The granulated material is given a final screening through a 16-mesh sieve after which it is packed in a thoroughly dry, air-tight container.

Using the above granulated material, an acceptance test is made on livestock with water treated with the above formula in the ratio of 2.5 grams per 1 litre with a lot of 50 two month old birds. Another container was provided with natural water to determine the preference and establish the consumed quantity. The test is carried out by using two drinking fountains each having a capacity of 10 litres. The fountains are brand new and are placed at different sites than the ones from which the birds usually drink. After 24 hours, the water consumption is as follows:

| | Litres |
|---|---:|
| Untreated water | 3.75 |
| Water containing granulated material | 4.00 |
| | 7.75 |

For two month old birds, the water consumption is of the order of 6 to 7.75 litres per 50 birds, but this figure varies according to the temperature. Therefore, from the above results, the conclusion is that the amount of water taken up by the animals is normal, due regard being taken to their ages and to the fact that they drank the same amount of untreated water as that treated with the granulated material obtained according to the process of the invention, even though the consumption of the latter one was slightly higher.

In laying birds, various water consumption controls were made and, as the previous case, there was no significant variation of the water consumption.

The above tests, in which granulated materials have been fed to birds through drinking water, have produced highly significant results. The use of minerals in solution, combined with proper quantities of vitamins and amino acids, has been tried. In young birds, it grants more strength and a faster recuperation after a disease. In laying hens, a greater recuperation after laying and a greater consistency in the egg-shell have been observed. In a lot of egg-laying hens, after an egg-laying period of one year, a 55% above average has been maintained without interruption, with an average weight of 65 grams during six months. In other words, the above holds true for animals until they are two years old. In another lot, a treatment has been made every month after the fifth egg laying month. It was possible to select the birds in such a manner that, at the tenth laying month, the weekly average is 65 to 75%, a highly satisfactory quantity, considering that the birds are not placed in laying cells.

PREPARATION NO. III

Solution of combined substances

This is a preparation for the combined use of vitamins, minerals and amino acids in the drinking water for horned and pig cattle, etc.

| | |
|---|---|
| Vitamin A D | 1.6 |
| Vitamin A | 6.4 |
| Sorbic Acid | 0.6 |
| Copper sulphate | 1.2 |
| Cobalt sulphate | 0.095 |
| Manganese citrate | 3.3 |
| Zinc chloride | 1.305 |
| Magnesium glycerophosphate | 32.5 |
| Iron saccharate | 12.6 |
| Polyvinyl pyrrolidone | 3.0 |
| Glutamic acid | 11.0 |
| Glucose | 26.4 |
| | 100.0 |

The manufacturing process is the same as the one described for the previous formulas; the craving for the water to which the granulated material has been incorporated has been excellent.

It has produced excellent results in animals undergoing a "stress," whether this was due to the effects caused by vaccination, a disease, change of housing or feeding. An appetite increase has been observed which is a sure sign of a prompt recuperation, as well as a stronger animal.

PREPARATION NO. IV

Combined dissolved substances

This is a preparation for the joint use of an anti-coccidiostatic agent, sulphamides, vitamins and minerals in the drinking water.

| | |
|---|---|
| 1-(4 amino-2-n.propyl - 5 - methyl pyridino)-2-pyroline | 16.0 |
| Sulphadimethylpyrimidine (soluble) | 16.0 |
| Vitamin K | 0.2 |
| Magnesium sulphate | 25.0 |
| Dextrose | 39.8 |
| Polyvinyl pyrrolidone | 3.0 |
| | 100.0 |

This formula is specially indicated in the prophylaxis and treatment of certain infectious diseases and to fight parasites in birds, rabbits or any other domestic species when there is a necessity for the collective treatment of a large number of animals, not discarding its application in individual treatments.

PREPARATION NO. V

Combined dissolved substances

This is a preparation containing anti-helminthic substances, helminthiasics and minerals.

| | |
|---|---|
| Piperazine citrate | 25.0 |
| Phenothiazine | 72.0 |
| Magnesium sulphate | 5.0 |
| Polyvinyl pyrrolidone | 3.0 |
| | 100.0 |

This preparation is indicated for the prophylaxis and treatment of anti-helminthic affections, against Enterobius vermicularis and Ascaris lumbricoides and thus, is a vermifuge of the general type, which may be used in drinking water.

The piperazine salts are known to be powerful and efficient against a great number of internal parasite species which are responsible for high economic losses in cattle raising. Their pronounced anti-parasitic effect is supplemented by the presence of phenothiazine which is insoluble but is dispersed in the solution during the granulating step. Magnesium sulphate is also used in the composition; it contributes to the elimination of parasites by facilitating their expulsion.

From the above description, it is obvious that this invention provides soluble granular substances, which may be emulsified in order to be administered to animals in drinking water or milk. The different elements of the composition are more easily absorbed since they do not have to be transformed into a liquid substance before being assimilated. However, it is not possible to use the group of substances described in the above preparations by way of injection. According to the invention, the granulated materials facilitate the treatments of herds of cattle containing a large number of animals, by a more effective use of the substances to be administered. Furthermore, the cost has been reduced due to the suppression of labor. Concrete results were realized by the cattlemen when using these substances which, even though they have been considered in the formulations of cattle feeds, due to the fact that they could not be used easily in isolated form with certain vitamins, antibiotics, etc., they were not considered to improve the output of their herds. The minerals and their joint use with the substances mentioned above and other, such as amino acids, hormones and other therapeutical products are also greatly advantageous.

This invention yields granulated materials having excellent manipulation and handling properties. It contributes to the use of many substances for feeding animals, whether they are supplements or complements of the feed and for the treatments, whether preventive or curative, through a comfortable medium, such as the drinking water. The granules are tasty and easy to assimilate after being ingested by the animals, thus bringing in energetic and active substances into the preparation. These granules are also stable, even in mixtures in which incompatible substances are mixed, for an excellent preservation all through the drying procedure, according to the nature of the substance. The above process for the production of granulated material has the advantages of being quite simple, only requiring the dissolution of emulsifying and suspension agents, the incorporation of the ingredients of the preparations, granulation and finely drying.

It is understood that the above preparations are given as illustrative only and that any combinations or modifications thereof are permissible as long as they fall within the scope of the appended claims.

What is claimed is:

1. A method for administering therapeutic ingredients intended for the prevention or cure of diseases to animals, individually or in groups, particularly cattle in herds, and poultry in flocks, via their drinking water supplies, which consist of the step of dissolving or dispersing therein dry stable granules prepared by a process comprising:

(a) reducing to a ground mixture a raw material containing at least one ingredient otherwise adversely affected by the influence of light, air, and atmospheric agents, intended for therapeutic use in animals;

(b) mixing and homogenizing the ground mixture;

(c) wetting the homogenized raw material with no more than at least one volatile organic solvent having an organic solvent soluble emulsifying or suspension agent capable of forming a protective layer stopping the adverse influence of light, air, and atmosphere agents, on the active therapeutic ingredient selected from the group consisting of polyvinyl pyrrolidone, n-lauryl sulphates, dioctyl sodium sulphosuccinates, alginates and polyethylene glycols dissolved therein, to form a water-free paste;

(d) converting said paste into a granulated material by passing the same through a 20 mesh sieve;

(e) drying out the solvent from said granulated material to form dry stable granules;

(f) passing the granules through a 10 to 50 mesh size screen; and (g) packing the granules in a thoroughly dry air-tight container.

2. Process according to claim 1 in which the ingredient intended for therapeutic use is selected from the group consisting of a mineral salt, a vitamin, an amino acid, an antibiotic, and a hormone.

3. Process according to claim 1, in which the emulsifying agent is polyvinyl pyrrolidone.

4. Process according to claim 1, in which the volatile organic solvent is selected from the group consisting of methanol, ethanol, isopropanol, acetone, benzene, dioxane and toluene.

5. Process according to claim 1, in which a compound selected from the group consisting of glucose, sucrose, saccharine and sodium cyclamate is added to the preparation to hide any bad taste inherent thereto or to provide inherent energy to the preparation.

References Cited

UNITED STATES PATENTS

| | | | |
|---|---|---|---|
| 2,887,436 | 5/1959 | Klioze et al. | 424—20 |
| 3,308,217 | 3/1967 | Lowy et al. | 264—117 |
| 3,400,185 | 9/1968 | Kohnle et al. | 264—117 |

OTHER REFERENCES

Peck et al.: Chemistry and Industry, Dec. 20, 1958, pp. 1674–1685.

Remingtons Practice of Pharmacy, Mack Pub. Co., Easton, Pa. (1961), p. 180.

Veterinary Drug Encyclopedia, R. H. Donnelley Corp. (1965), p. 136.

Cooper et al., J.A.PH.A., vol. 46, No. 9, pp. 520–524 (1957).

Merck Index, Merck & Co., Rahway, N.J. (1960), pp. 484–487.

SHEP K. ROSE, Primary Examiner

U.S. Cl. X.R.

424—31, 32, 34, 35, 78, 80; 99—2, 4; 264—117